(12) United States Patent
Taguchi et al.

(10) Patent No.: US 8,510,078 B2
(45) Date of Patent: Aug. 13, 2013

(54) METHOD AND SYSTEM FOR REGISTERING AN OBJECT WITH A PROBE USING ENTROPY-BASED MOTION SELECTION AND RAO-BLACKWELLIZED PARTICLE FILTERING

(75) Inventors: Yuichi Taguchi, Cambridge, MA (US); Tim K. Marks, Newton, MA (US); John R. Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 247 days.

(21) Appl. No.: 13/184,311

(22) Filed: Jul. 15, 2011

(65) Prior Publication Data
US 2011/0276307 A1    Nov. 10, 2011

Related U.S. Application Data

(63) Continuation-in-part of application No. 12/751,366, filed on Mar. 31, 2010, now Pat. No. 8,219,352.

(51) Int. Cl.
*G05B 19/18*    (2006.01)

(52) U.S. Cl.
USPC ............ 702/150; 702/151; 702/152; 702/153

(58) Field of Classification Search
USPC .............. 702/94, 95, 97, 150–153, 179, 181; 700/245, 253, 258, 259; 701/23, 25, 26, 701/207, 208; 901/1, 14, 46, 47
See application file for complete search history.

(56) References Cited

U.S. PATENT DOCUMENTS
8,055,382 B2 * 11/2011 Myeong et al. ............... 700/253

OTHER PUBLICATIONS

Kwak et al. "Result Representation of RAO-Blackwellized Particle Filtering for SLAM" Oct. 2008.
Doucet et al. "RAO-Blackwellized Particle Filtering Dynamic Bayesian Networks".
Li et al. "Novel RAO-Blackwellized Particle Filter for Mobile Robot SLAM Using Monocular Vision" 2006.

* cited by examiner

*Primary Examiner* — Sujoy Kundu
(74) *Attorney, Agent, or Firm* — Dirk Brinkman; Gene Vinokur

(57) ABSTRACT

A probe is registered with an object by probing the object with the probe at multiple poses, wherein each pose of the probe includes a location and an orientation. A probability distribution of a current location of the probe is represented by a set of particles, and a probability distribution of a current orientation of the probe is represented by a Gaussian distribution for each particle conditioned on the current location. A set of candidate motions is chosen, and for each candidate motion, an expected uncertainty based on the set of particles is determined. The candidate motion with a least expected uncertainty is selected as a next motion of the probe, the probe is moved according to the next motion, and the set of particles is updated using the next pose of the probe.

20 Claims, 2 Drawing Sheets

200

METHOD AND SYSTEM FOR REGISTERING AN OBJECT WITH A PROBE USING ENTROPY-BASED MOTION SELECTION AND RAO-BLACKWELLIZED PARTICLE FILTERING

RELATED APPLICATION

This a Continuation-in-Part of U.S. Pat. No. 8,219,352, "Localization in Industrial Robotics Using Rao-Blackwellized Particle Filtering" filed by Taguchi and Marks, on Mar. 31, 2010, incorporated herein by reference.

FIELD OF THE INVENTION

This invention relates generally to industrial robotics, and more particularly to a probing-based method and system for probabilistic localization in industrial robotics.

BACKGROUND OF THE INVENTION

Registering an object with respect to a robot is performed in many industrial assembly tasks, such as grasping and insertion. Registering refers to finding a relative pose between the object and the robot. Probing-based registration methods use a probe attached to the robot to measure locations of contact with the object and use the locations to register the robot with respect to the object.

Some conventional methods use probing and particle-based Monte-Carlo localization to solve the registration problem. For example, one method describes a localization using probing and particle filtering for a lock and key assembly. As a preprocessing step, that method densely probes a grid of (x, y) locations on the object with the probe to obtain a dense set of contact locations (x, y, z), generating a contact configuration-space map, which describes possible poses wherein the probe has contact with the object. Then, the method performs particle filtering by probing the object sequentially, using the sequence of contact locations obtained from the probing. Likelihoods are evaluated using the contact configuration-space map.

Another method that uses a preprocessing step of densely probing the object uses a force and torque sensor connected to the probe to generate a force-torque map. The force-torque map includes the contact force and torque at every possible pose at which there is contact between the probe and the object. That method also describes estimating the force-torque map directly from a computer-aided design (CAD) model. Using the force-torque map, which was acquired in advance by dense probing, particle filtering is used with sequential probing to match the force-torque measurements to the map. That method also optionally incorporates observations from a camera.

To reduce the number of particles required for 6-degrees-of-freedom (6-DOF) registration, another method uses a coarse-to-fine approach by assigning a region, instead of a single point, to each particle. That method first determines regions of high likelihood at a coarse resolution by increasing the measurement uncertainty, and then iteratively resamples particles inside the regions while reducing the uncertainty.

Given a set of point measurements and a 3D model of the object as a set of planes, some methods use three correspondences between 3D planes and 3D points with normals for 6-DOF registration. One method uses six 3D point to 3D plane correspondences. Each of these methods uses the minimum number of correspondences and is suitable as a hypothesis generator in hypothesis-and-test frameworks such as RANdom SAmple Consensus (RANSAC). Another method that uses point-to-plane correspondences utilizes branch-and-bound optimization to achieve a globally optimal registration. Iterative closest point (ICP) methods often do not reach a global optimum unless they have a good initial estimate of the registration. Although those offline methods provide solutions to the point-plane registration problem, they assume that a complete set of contact measurements has already been collected. They provide no method for selecting a good next motion based on an already-collected subset of contact measurements, nor do they provide a termination condition for determining when enough measurements have been collected.

To our knowledge, the general problem of motion selection, i.e., planning where to probe next, has not previously been addressed in probing-based registration. However, motion selection is known in mobile robotics, such as in active simultaneous localization and mapping (active SLAM) applications, in which a method plans the next motion of a mobile robot.

In mobile robotics, selecting the next motion is often addressed using entropy-based measures, such as expected information gain, or reduction in entropy, which measure a reduction in uncertainty. However, entropy estimation methods that are typically used in conventional mobile robotics, such as determining the entropy of a particle distribution using a Gaussian approximation, are not well suited to probing-based registration.

SUMMARY OF THE INVENTION

Registering an object with respect to a robot is performed in many industrial assembly tasks, such as grasping and insertion. Probing-based registration methods use a probe attached to a robot to measure multiple locations of contact with the object and use the locations to register the robot to a model of the object. In that approach to registration, the selection of contact locations is not typically discussed.

The embodiments of the invention provide a method for selecting a next robot motion to maximize the expected reduction in uncertainty, quantified as the expected information, obtained by the resulting contact with the object. The method performs 6-DOF registration in a Rao-Blackwellized particle filtering (RBPF) framework as follows.

The locations of the probe are represented by a set of particles. A 3D Gaussian angular distribution is defined for each particle.

Using a map, derived from a 3D model of the object and an uncertainty model, as well as the current particle distribution, the expected information gain from a next robot motion is determined using the entropy of the particles updated by the motion.

The motion that provides a maximum information gain, i.e., a least entropy, is selected and used for the next measurement. The process is repeated until a termination condition is reached, such as a convergence of the particle distribution or a predetermined number of probings.

DETAILED DESCRIPTION OF THE PREFERRED EMBODIMENT

The embodiments of the invention provide a method and system for registering an object with respect to a probe that is attached to or integrated into a robot. A pose of the probe includes a (translational) location and an (angular) orientation. Each probing determines a point of contact between the object and the probe, such that the pose can be estimated at each point of contact. The object has an associated object coordinate system, and the probe has an associated probe coordinate system. The probe is registered with respect to a coordinate system of the robot. Therefore, the registration between the robot and the object is determined by the registration between the probe and the object.

In U.S. application Ser. No. 12/751,366, we used Rao-Blackwellized particle filtering (RBPF) for the 6-DOF registration problem. The particles factorize the probability distribution into a 3-DOF location of the particles, and 3-DOF angular distribution, approximated by a Gaussian distribution conditioned on the location of each particle.

There, we register the object with the probe by touching the object using the probe attached to a robot arm. We used a sequence of touches to do this registration. Each motion, which determined the next touch point in the sequence, was selected randomly.

Now, we describe a motion selection method based on the RBPF framework previously disclosed. This method determines an optimal next motion based on entropy. We also describe a novel application of this method for human-guided registration, as well as automatic registration.

Probing-Based 6-DOF Registration Using Rao-Blackwellized Particle Filtering

Figure 1:
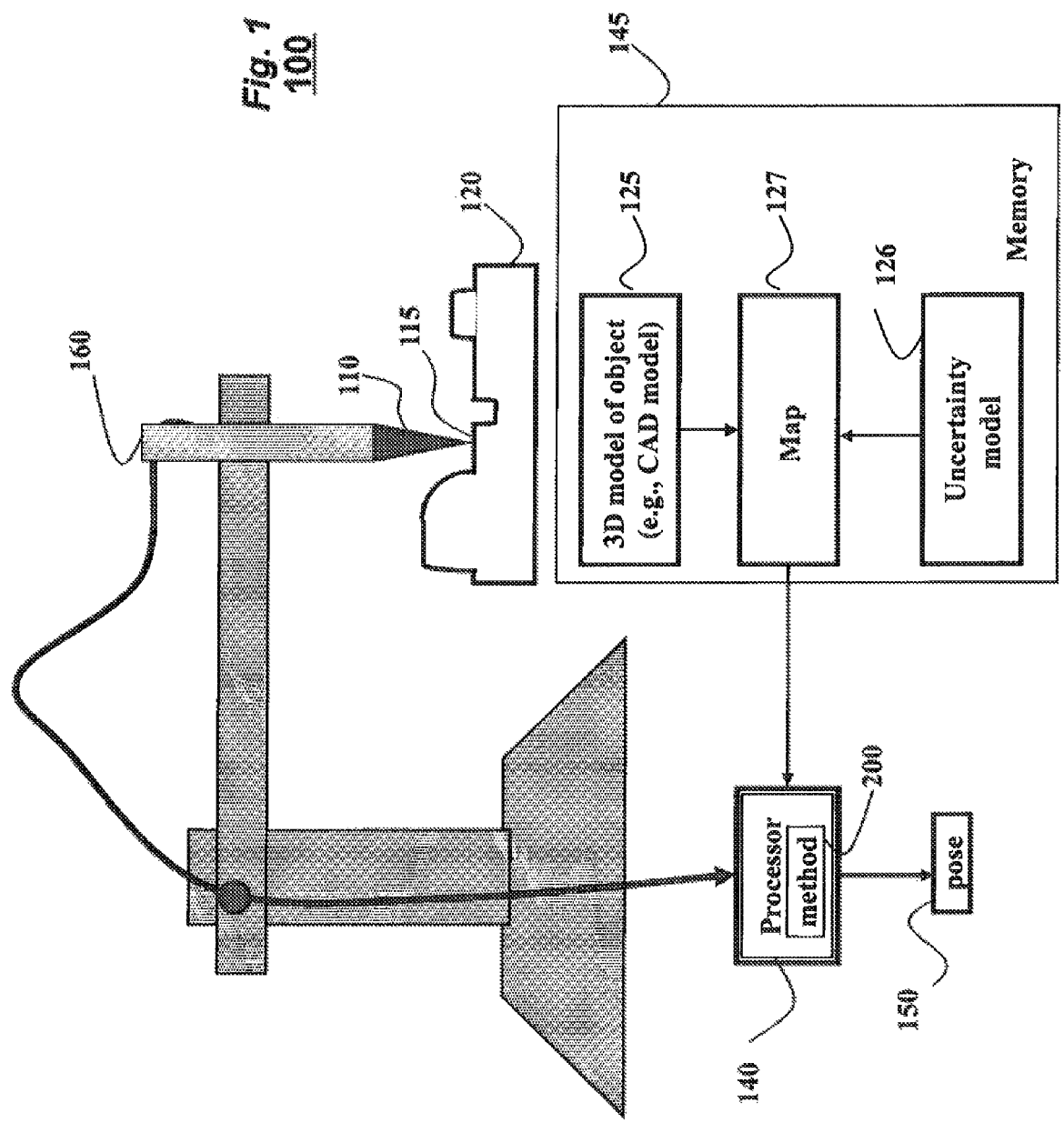
FIG. 1 is a schematic of a system for registering an object with respect to a probe that is attached to or integrated into a robot according to the embodiments of the invention.

FIG. 1 shows a system 100 and a method 200 for registering an object 120 with a probe 110. In various embodiments of the invention, the probe is a touch probe, e.g., one that uses force and torque measurements, or a touchless probe, e.g., electrical, mechanical, optical, or laser probe. Each probing determines a point of contact 115 with the object.

A pose (location and orientation) of the probe with respect to the object is determined. The pose can subsequently be used in an industrial process, which can involve picking up the object, positioning the object, mating a part to the object, determining the pose of the robot with respect to the object, calibrating a coordinate system of the object or world with respect to a robot coordinate system, or using a tool on the object, such as a spray gun, arc welder, drill, or grinder.

The object is represented by a 3D model 125, such as a CAD model. An uncertainty model 126, in up to three degrees of freedom (3-DOF), describes the uncertainty inherent in the measurements acquired by the probe. The 3D model and the uncertainty model can be combined to generate a map 127 used by the method 200 performed in a processor 140 to determine the pose 150. The processor includes input/output interfaces and a memory 145 as known in the art. The 3D model, the uncertainty model, and the map can be stored in the memory 145. Alternatively, the method can be implemented by other means, such as discrete circuits, a field-programmable gate array (FPGA), or a dedicated digital signal processor.

In one embodiment, the probing is achieved by applying a motion to a robot arm 160 on which the probe is arranged until detecting a contact between the probe and the object.

General Method

Embodiments of the invention are based on a realization that standard particle filtering applied to an estimation of the 6-DOF pose of the probe is extremely inefficient, because the number of particles required is roughly exponential in the number of degrees of freedom. However, the 6-DOF pose can be factorized into two parts, i.e., a 3-DOF location, represented by a set of particles, and a 3-DOF orientation, represented by a Gaussian distribution, such that the each particle maintains its own distribution for the orientation of the probe. The orientation for each particle can be updated using Kalman filtering. Based on this realization, the 6-DOF particle filtering is reduced to 3-DOF particle filtering and 3-DOF Kalman filtering. The framework of such factorization is known as Rao-Blackwellized particle filtering (RBPF).

Generally, the problem is to register the object with the probe. This is performed by determining the pose of the probe with respect to the object by measuring 3D contact locations.

The 6-DOF uncertainty in the pose is $(s, \theta)$, where $s$ is the 3D translational location $(x, y, z)^T$, $\theta$ is the 3D angular orientation $(\alpha, \beta, \gamma)^T$, and $T$ is a transpose operator.

Given a sequence of motions from time 1 to t, denoted $u_{1:t}$, and a sequence of measurements from time 0 to t, denoted $z_{0:t}$, our goal is to infer a posterior probability distribution over the locations and orientations, $p(s_{0:t}, \theta | z_{0:t}, u_{1:t})$.

Our approach is to factorize the posterior probability distribution into locations and orientations as follows:

$$p(s_{0:t}, \theta | z_{0:t}, u_{1:t}) = p(s_{0:t} | z_{0:t}, u_{1:t}) p(\theta | s_{0:t}, z_{0:t}). \qquad (1)$$

The probability distribution over the location (the first factor on the right-hand side of Eqn. (1)) is represented by particles, which enables us to represent multimodal distributions for locations. The probability distribution over the orientation (the second factor on the right-hand side of Eqn. (1)) is represented as a Gaussian distribution for each particle, conditioned on the current and previous locations of the particle.

Eqn. (1) can be efficiently solved, because the distribution over orientation $p(\theta | s_{0:t}, z_{0:t})$ can be analytically determined using extended Kalman filtering (EKF), after the location of each particle $s_{0:t}$ is determined by particle filtering.

More specifically, we first update the location of each particle using the motion model and determine the weight of the particle by computing a likelihood based on the map 127 and the previous Gaussian distribution of the particle over orientation. Then, we update the Gaussian distribution of the orientation of the particle using EKF.

This process can be repeated until a termination condition is met. Possible termination conditions include reaching a predetermined number of probings, or a convergence of the particle locations.

Entropy Estimation for Motion Selection

Unlike in SLAM, in which both the map and the location are estimated over time, in our probing-based registration, the map 127, is known, and only the relative pose 150 between object and probe is unknown.

In our previous RBPF registration framework, described in more detail in our application U.S. application Ser. No. 12/751,366, we obtained each next point of contact using a random next motion. Here, we select an optimal next motion based on minimizing uncertainty, which is achieved by minimizing entropy.

Figure 2:
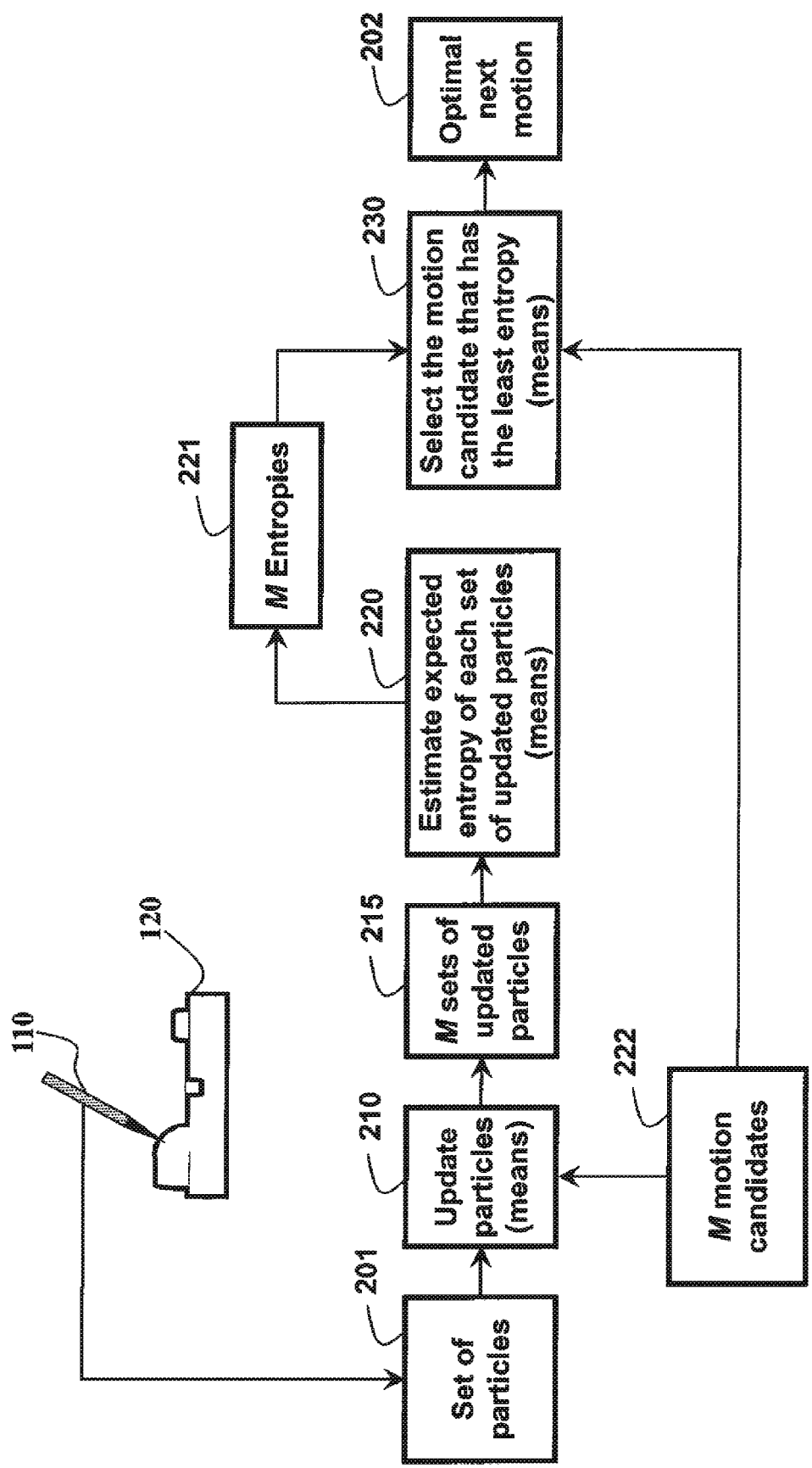
FIG. 2 is a block diagram of a method for registering the object with respect to the probe according to the embodiments of the invention.

As shown in FIG. 2, the current location of the probe 110 with respect to the object 120 is represented by a set of particles 201. The orientation of the probe is represented by a Gaussian distribution associated with each particle, conditioned on the particle's location. Our goal is to choose a next motion that minimizes the expected entropy of our RBPF filtering distribution in Eqn. (1), which can be seen as minimizing the uncertainty over both the relative location and the relative orientation between the object and the probe. To do so, we choose a set of M candidate motions 222, and use each candidate motion to update 210 the current set of particles 201, obtaining M sets of updated particles 215. Then, we estimate 220 the expected entropy 221 of each of these sets of updated particles and select 230 the motion that results in the least entropy 221.

In one embodiment, we estimate the entropy by approximating the particle distribution using a single multivariate Gaussian distribution. We contrast this Gaussian approximation approach with other entropy estimation methods. One of our embodiments is based only on particle weights, and other embodiments use nonparametric entropy estimates based on Parzen windows.

Entropy of a Rao-Blackwellized Particle Filter

The entropy of the posterior probability distribution (Eqn. (1)) of the Rao-Blackwellized particle filter (RBPF) can be represented as $$H(p(s_{0:t}, \theta | z_{0:t}, u_{1:t})) = H(p(s_{0:t} | z_{0:t}, u_{1:t})) + E_{s_{0:t}}[H(p(\theta | s_{0:t}, z_{0:t}))], \quad (2)$$

where $E_{s_{0:t}}[\ ]$ denotes an expectation over the random variable $s_{0:t}$. The first term on the right-hand side of Eqn. (2) represents the entropy of the location distribution, which is represented using particles, and the second term, described below, represents the entropy of the angular distribution.

To determine the first term, we estimate the entropy of a continuous distribution based on a collection of weighted samples, which is not straightforward. We describe a variety of alternatives for determining this entropy below.

Entropy of Angular Distribution

The second term on the right-hand side of Eqn. (2) can be determined as follows. Because the distribution over location $s_{0:t}$ is represented by particles, the expectation is approximated as $$E_{s_{0:t}}[H(p(\theta | s_{0:t}, z_{0:t}))] = \sum_{j=1}^{J} w_t^{[j]} H\left(p\left(\theta | s_{0:t}^{[j]}, z_{0:t}\right)\right), \quad (3)$$

where $s^{[j]}_{0:t}$ is the sequence of locations up to time t of the jth particle, $w^{[j]}_t$ is the weight of the jth particle at time t (normalized so that $\Sigma_j w^{[j]}_t = 1$), and J is the number of particles. Because $p(\theta | s^{[j]}_{0:t}, z_{0:t})$ is a Gaussian distribution, it can be written as $p(\theta | s^{[j]}_{0:t}, z_{0:t}) = N(\theta; \mu, \Sigma)$, representing the multivariate Gaussian probability density function (pdf) of $\theta$ with a mean $\mu$ and a covariance matrix $\Sigma$.

The entropy of the Gaussian distribution is determined using the formula for the entropy of a d-dimensional Gaussian distribution:

$$H\left(N\left(\theta; \mu, \sum\right)\right) = \frac{1}{2} \log\left((2\pi e)^d \left|\sum\right|\right). \quad (4)$$

Here $|\Sigma|$ denotes the determinant of the covariance matrix $\Sigma$.

Entropy of Location Distribution

Determining the entropy of the location distribution, which is represented by a collection of weighted particles, amounts to determining the entropy of an unknown probability density function (pdf) based on a finite number of weighted samples. This is inherently an ill-posed problem because no finite sample is sufficient to determine an arbitrary density distribution. Thus, some assumptions must be made about either the functional form of the distribution, or its smoothness.

We approximate the first term in Eqn. (2), the entropy of the location distribution, as $$H(p(s_t | z_{0:t}, u_{1:t}));$$

i.e., we consider only the current locations of the particles and not their previous locations. The distribution whose entropy we wish to estimate is $$f(s_t) = p(s_t | z_{0:t}, u_{1:t}). \quad (5)$$

The notation can be simplified by omitting the subscript t from the variables s and w. For example, we denote the function in Eqn. (5) as $f(s)$, and we use $s^{[j]}$ and $w^{[j]}$ to respectively represent the location and weight of particle j at time t.

We estimate the entropy of the unknown pdf $f(s)$ using the locations and weights of J particles.

Estimating the Entropy of the Location Distribution

We compare several methods for estimating this entropy.

First, we approximate the entropy of this distribution using a parametric approach, in which the entropy is determined by assuming the distribution is Gaussian. If the distribution is not Gaussian, then this parametric approach is inaccurate. Thus, we also consider a non-parametric approach to entropy estimation, determining the entropy using a Parzen-window based kernel density estimate of the distribution with various kernels. We also consider estimating the entropy using only the particle weights, while ignoring the spatial locations of the particles, by treating the set of weights as a set of probability masses in a discrete probability distribution.

Gaussian Approximation of the Particle Distribution

To fit a Gaussian function to the particle distribution at time t, we determine the weighted average $\bar{s}$, and weighted covariance matrix $\Sigma$:

$$\bar{s} = \sum_{j=1}^{J} w^{[j]} s^{[j]}, \quad (6)$$

$$\sum = \frac{\sum_{j=1}^{J} w^{[j]} (s^{[j]} - \bar{s})(s^{[j]} - \bar{s})^T}{1 - \sum_{j=1}^{J} (w^{[j]})^2},$$

where $w^{[j]}_t$ is the weight of particle j at time t (with $\Sigma_j w^{[j]}_t = 1$), and $s^{[j]}$ is the location of particle in the object coordinate system. We have thus approximated $f(s)$ as a multivariate Gaussian, $\hat{f}(s) = N(s; \bar{s}, \Sigma)$, whose entropy can be determined using Eqn. (4).

Kernel Density Estimate of the Particle Distribution

In the Gaussian entropy approximation, we assumed that the particles are weighted samples from a distribution with a particular functional form (Gaussian) and used the samples to estimate the function's parameters. An alternative approach for estimating a distribution from a collection of samples is to use a non-parametric method such as kernel density estimation. Here, we use a Parzen window-based approximation of the distribution to estimate its entropy. From the collection of location samples, and corresponding nonnegative weights, we can approximate the unknown probability density $f(s)$ using a weighted Parzen density estimate.

A conventional Parzen window typically refers to unweighted samples or samples with equal weights. In contrast, we use a weighted version of Parzen density estimation, $$\hat{f}(s) = \sum_{j=1}^{J} w^{[j]} k(s - s^{[j]}), \qquad (7)$$

where k( ) is the kernel function. We estimate the entropy of f(s) by the entropy of $\hat{f}(s)$, $$H(\hat{f}(s)) = -\int \hat{f}(s) \log \hat{f}(s) ds \qquad (8)$$
$$= -E_{\hat{f}(s)}[\log \hat{f}(s)],$$

where $E_{p(x)}[g(x)]$ represents the expected value of the function g(x) when the random variable x is distributed according to the pdf p(x).

Unfortunately, for a wide variety of choices of kernel function k( ), including a simple Gaussian kernel, determining the integral in Eqn. (8) analytically is difficult or impossible. However, we can approximate the expectation over the probability distribution $\hat{f}(s)$ as an expectation over the weighted samples $s^{[j]}$. Our entropy estimate then simplifies to $$\hat{H}(\hat{f}(s)) = -E_{\{s^{[j]}, w^{[j]}\}}[\log \hat{f}(s)] \qquad (9)$$
$$= -E_{\{s^{[j]}, w^{[j]}\}}\left[\log\left(\sum_{i=1}^{J} w^{[i]} k(s - s^{[i]})\right)\right]$$
$$= -\sum_{j=1}^{J} w^{[j]} \log\left(\sum_{i=1}^{J} w^{[i]} k(s^{[j]} - s^{[i]})\right).$$

A variety of kernel functions can be used. We consider a family of zero-mean, radially symmetric kernel functions of the form $$k(s) \propto e^{-\frac{1}{2} \|s\|_2^n / \sigma^n} \qquad (10)$$

in which the parameter σ controls the kernel width, and exponent n controls how heavy-tailed the kernel function is. If n=2, then the kernel function in Eqn. (10) is a spherically symmetric Gaussian kernel with a marginal variance of $\sigma^2$ in each dimension. We can ignore the kernel's constant of proportionality in Eqn. (10). This is because the constant is fixed for any particular choice of values of n and σ, and multiplying the kernel function k in Eqn. (9) by a constant factor merely adds a constant (the negative log of the constant factor) to the entropy estimate.

Estimating Entropy Using Only the Particle Weights

An entropy estimate that uses only the particle weights, completely ignores particle locations. This estimate treats the entire set of weights as a set of probability masses in a discrete probability distribution and determines the entropy of this discrete distribution $$H(\{w^{[j]}\}) = \sum_{j=1}^{J} -w^{[j]} \log w^{[j]}. \qquad (11)$$

Motion Selection Method

We describe a method for selecting an optimal next motion using the entropy measure of RBPF described above. Compared to random motion selection, the method enables us to use a smaller number of measurements to achieve the same accuracy, or alternatively, to achieve a higher accuracy using the same number of measurements.

We describe an overview of our entropy-based motion selection method, and then describe how to apply the method to two different applications: automatic registration and human-guided registration.

Overview of the Method

Given a set of particles 201 at time t, $X_t$, we use a greedy approach that selects 230 the optimal next motion 202 from M candidate motions 222 $\Gamma_m$ (m={1, ..., M}). We determine 220 an expected entropy 221 for each candidate motion 222 and select 230 the one with the least expected entropy for the next motion. For efficiency of entropy computations, we approximate the particle set $X_t$ by its subset $Y_t$, the K particles with highest weights, where K≦J.

Each motion candidate $\Gamma_m$ is randomly chosen. For each motion candidate $\Gamma_m$, we simulate the measurement process C times, each time selecting a random particle $q^{[c]}$ from $Y_t$ with probability proportional to the particle's weight. For each $q^{[c]}$, we compute the answer to the following question: If $q^{[c]}$ is correct about the relative pose between the object and the robot, then when we perform the motion dictated by $\Gamma_m$, what contact position measurement would result? The answer gives us the estimated motion $\hat{u}_t^{[c]}$, which is used to update the particle set $Y_t$. This results in an updated particle set, $Y^{[c]}_{t+1}$, whose entropy is computed. We repeat this simulation procedure C times and compute the expected entropy for motion candidate $\Gamma_m$ as the average over the C simulations.

We assume that the cost to move the probe to the next position is independent of the position, since in our application the time required to move the robot between measurement positions is much less than the time required to precisely measure a single contact location. For applications in which different motion candidates have different costs, e.g., if moving to a more distant position takes more time, one can incorporate the movement into the cost function in addition to the entropy.

Application to Automatic Registration

For automatic registration, the method in U.S. application Ser. No. 12/751,366 applies random motions in the x and y directions with respect to the robot coordinate system, and then measures the z position by moving the probe towards the object parallel to the z axis of the robot coordinate system until contact.

To apply our entropy-based motion selection method in this framework, each motion candidate $\Gamma_m$ describes a random displacement in the x and y directions in the robot coordinate system, and the measurement of the z position is simulated for each particle $q^{[c]}$. Particle $q^{[c]}$ maintains an estimate of the relative pose between robot and object, which includes a 3D position $S_t^{[c]}$ and a Gaussian distribution over angle that has a mean $\mu_\theta^{[c]}$. We use the particle's position $S_t^{[c]}$ and mean angle $\mu_\theta^{[c]}$, in conjunction with the model of the object, to estimate the location at which the probe would contact the object. The estimated motion in the z direction, combined with the (x, y) displacement given by $\Gamma_m$, constitute the expected motion $\hat{u}_t^{[c]}$.

During automatic registration, our system and method continuously measures the force/torque values applied to the probe while moving a robot towards the object. The motion is terminated when the measurements exceed predetermined thresholds. Our system first detects a contact location roughly using a large motion step size, and then refines the contact location using a small motion step size to achieve precise location measurements.

Application to Human-Guided Registration

In some cases, the automatic registration process described above may be impractical. For instance, there might be other objects nearby that restrict the possible motions of the robot. Another example is that if the object does not have enough useful features that can be probed from a single direction, we may probe the object from multiple directions. In such cases, letting a human operator move the robot to measure the contact positions is often safer and more practical.

A visualization system can suggest an optimal touch location on the object to the human operator to achieve fast and accurate registration.

Our system is initiated by a human operator. The operator moves the probe to any position on the object surface and specifies to the system the approximate position on the object surface. The system initializes all of its particles near the location indicated by the operator, with an angular distribution selected from a range that includes every possible initial angle of contact of the probe with the surface. In this human-guided case, each candidate motion $\Gamma_m$ is a randomly chosen point on the object surface, in object coordinates. For each particle $q^{[c]}$, we determine the expected motion $\hat{u}_t^{[c]}$ by computing the motion required to move the particle to the selected point on the object surface. The expected motion is then used to update the particles $Y_t$.

The method selects the motion candidate $\Gamma_m$ that minimizes the expected entropy and directs the operator to probe next at that location on the object. Our system also visualizes the current force/torque measurements to the operator so that the operator can control the robot motion to determine precise contact locations.

Note that the operator does not have to move the probe precisely to the suggested position. The RBPF framework works properly as long as the next contact is anywhere on the surface of the object. However, since the suggested position achieves the minimum entropy of all of the motion candidates, using the method's suggested location enables accurate registration to be performed with fewer measurements.

Effect of the Invention

We described a method and system for online motion selection in probing-based registration of a robot to an object whose 3D model is known. Unlike prior art methods, which randomly choose each motion, our RBPF-based method chooses several candidate motions, then uses estimates of expected uncertainty, in the form of expected entropy, to select the best candidate motion. We apply our method not only to fully automatic registration, but also to human-guided registration. Our entropy-based motion selection method significantly outperforms random motion selection.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for registering a probe with an object by probing the object with the probe at multiple poses, wherein each pose of the probe includes a location and an orientation, comprising the steps of:

representing a probability distribution of a current location of the probe by a set of particles, wherein each particle has a location and a weight corresponding to a probability of the particle, and representing a probability distribution of a current orientation of the probe by a Gaussian distribution for each particle conditioned on the location of the particle;

choosing a set of candidate motions;

determining, for each candidate motion, an expected uncertainty based on the set of particles;

selecting the candidate motion with a least expected uncertainty as a next motion of the probe;

moving the probe according to the next motion; and updating the set of particles using the next pose of the probe, wherein the registration is in a Rao-Blackwellized particle filtering (RBPF) framework and wherein the steps are performed in a processor.

2. The method of claim 1, wherein the updating further comprises:

determining the location of each particle in the set of particles using a motion model;

determining the weight of each particle in the set of particles using a likelihood based on a map derived from a 3D model of the object, and an uncertainty model, wherein the uncertainty model describes an uncertainty inherent in measurements acquired by the probe; and updating the Gaussian distribution of each particle in the set of particles using extended Kalman filtering.

3. The method of claim 1 wherein the pose is (s, θ), where s is a relative 3D translational location $(x, y, z)^T$, θ is a relative 3D angular orientation $(\alpha, \beta, \gamma)^T$, and T is a transpose operator.

4. The method of claim 3, wherein a sequence of poses is $s_{0:t}$ from time 0 to t, a sequence of motions is $u_{1:t}$ from time 1 to t, and a sequence of measurements is $z_{0:t}$ from time 0 to t, and further comprising:

inferring a posterior probability distribution $p(s_{0:t}, \theta | z_{0:t}, u_{1:t})$ over the location and the orientation.

5. The method of claim 4, further comprising:

factorizing the posterior probability distribution over the location and the orientation as:

$$p(s_{0:t}, \theta | z_{0:t}, u_{1:t}) = p(s_{0:t} | z_{0:t}, u_{1:t}) p(\theta | s_{0:t}, z_{0:t}).$$

6. The method of claim 5, wherein the uncertainty of the posterior probability distribution is determined as an entropy $$H(p(s_{0:t}, \theta | z_{0:t}, u_{1:t})) = H(p(s_{0:t} | z_{0:t}, u_{1:t})) + E_{s_{0:t}}[H(p(\theta | s_{0:t}, z_{0:t}))],$$

wherein $E_{s_{0:t}}[\ ]$ denotes an expectation over $s_{0:t}$, and $$H(p(s_{0:t} | z_{0:t}, u_{1:t}))$$

represents the entropy of the probability distribution over the location, and $$E_{s_{0:t}}[H(p(\theta | s_{0:t}, z_{0:t}))]$$

represents the entropy of the probability distribution over the orientation.

7. The method of claim 6, wherein the entropy of the probability distribution over the orientation is estimated from the weights of the particles in the set of particles and the Gaussian distributions of the particles in the set of particles.

8. The method of claim 6, wherein the entropy of the probability distribution over the location is estimated by using a single Gaussian distribution to approximate the locations and the weights of the particles in the set of particles.

9. The method of claim 6, wherein the entropy of the probability distribution over the location is estimated by using kernel density estimation from the locations and weights of the particles in the set of particles.

10. The method of claim 6, wherein the entropy of the probability distribution over the location is estimated by using only the weights of the particles in the set of particles.

11. The method of claim 1, wherein the probe is attached to a robot arm, and the probe is automatically moved by the robot arm according to the next motion.

12. The method of claim 1, wherein the probe is manually moved by an operator, and the next motion is used to guide the operator to move the probe.

13. The method of claim 1, wherein the candidate motions are selected randomly.

14. The method of claim 1, wherein the steps are repeated until a termination condition is met.

15. The method of claim 14, wherein the termination condition is a predetermined number of probings.

16. The method of claim 14, wherein the termination condition is a convergence of the locations of the particles in the set of particles.

17. The method of claim 1, wherein the multiple poses are measured in a coordinate system of the probe.

18. The method of claim 1, wherein the location and orientation describe a transformation between an object coordinate system and a probe coordinate system.

19. The method of claim 1, wherein the candidate motions are represented in a coordinate system of the probe.

20. A system for registering a probe with an object by probing the object with the probe at multiple poses, wherein each pose of the probe includes a location and an orientation, comprising the steps of
means for representing a probability distribution of a current location of the probe by a set of particles, wherein each particle has a location and has a weight corresponding to a probability of the particle, and for representing a probability distribution of a current orientation of the probe by a Gaussian distribution for each particle conditioned on the location of the particle;
means for choosing a set of candidate motions;
means for determining, for each candidate motion, an expected uncertainty based on the set of particles;
means for selecting the candidate motion with a least expected uncertainty as a next motion of the probe;
a robot arm configured to move the probe according to the next motion; and
means for updating the set of particles using the next pose of the probe, wherein the registration is in a Rao-Blackwellized particle filtering (RBPF) framework.

* * * * *